A. J. HEINSIUS.
ANTISKID CHAIN.
APPLICATION FILED FEB. 11, 1916.

1,199,698.   Patented Sept. 26, 1916.

WITNESS

INVENTOR
Albert J. Heinsius,
by Edward A. Laurence,
his attorney.

UNITED STATES PATENT OFFICE.

ALBERT J. HEINSIUS, OF CHARLEROI BOROUGH, PENNSYLVANIA, ASSIGNOR OF ONE-HALF TO CHARLES C. DIETER, OF PITTSBURGH, PENNSYLVANIA.

ANTISKID-CHAIN.

1,199,698.  Specification of Letters Patent.  Patented Sept. 26, 1916.

Application filed February 11, 1916. Serial No. 77,548.

*To all whom it may concern:*

Be it known that I, ALBERT J. HEINSIUS, a citizen of the United States, and residing in the borough of Charleroi, in the county of Washington and State of Pennsylvania, have invented or discovered new and useful Improvements in Antiskid-Chains, of which the following is a specification.

My invention comprises a new and improved device for preventing the skidding or sliding of power-driven vehicles.

The object in view is the provision of efficient means for the above mentioned purpose which will be inexpensive, durable and easy to apply and remove.

For the accomplishment of this object, I provide a plurality, say from three to eight, chains for a wheel each adapted to be individually locked around the wheel tread, between the spokes, by the interlocking of the two ends of the chain. I provide a new and improved locking means for the chain ends, and also means for securing the loose end of the chain to prevent accidental unlocking.

Figure 1:
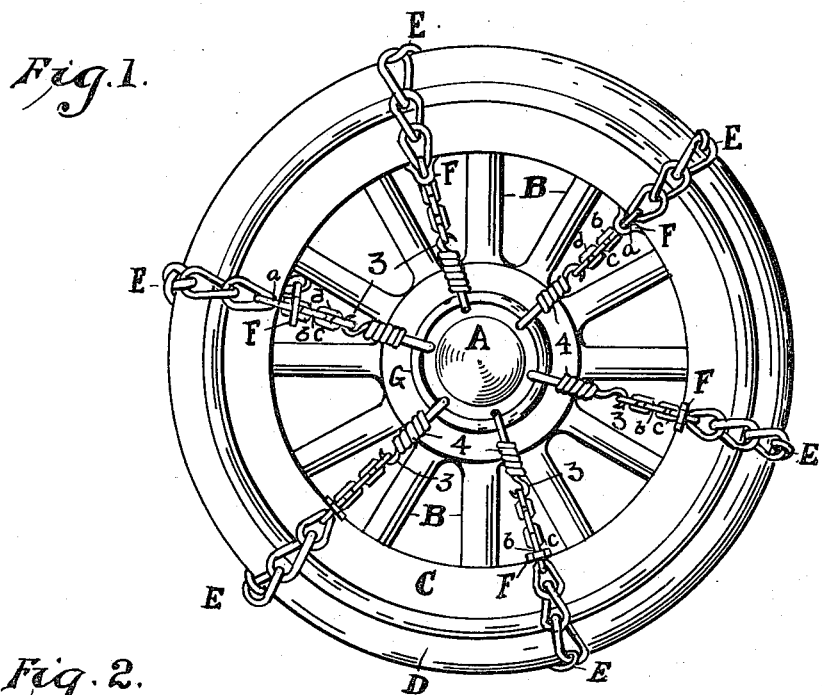
Figure 2:
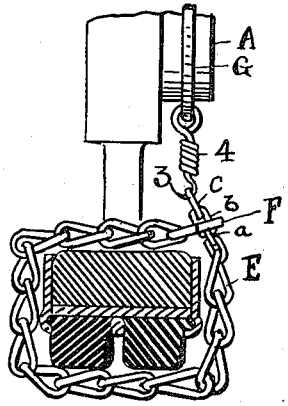
Figure 3:

In the accompanying drawings, Figure 1 is a side elevation of a motor-truck wheel provided with my invention; Fig. 2 is a broken transverse section of the same showing one of the chains, and Fig. 3 is an enlarged detail showing the locking ring and the chain end secured therein.

The following is a detailed description of the drawings.

A represents the hub of a vehicle wheel, B the spokes, C the rim, and D the tire, shown as a double solid tire, such as is usually provided for the driving wheels of a motor truck.

The anti-skid or anti-slip device consists of a plurality of individual chains E provided at one end with a locking ring F which consists of a circular portion 1 of sufficient internal diameter to permit the easy passage therethrough of the other end of the chain and a slotted or contracted portion 2 adapted to admit the links of the other end of the chain when inserted edgewise therein, but of insufficient width to permit the passage of a link turned at an angle to said slot.

It is evident that the chain end may be freely drawn through the opening 1 in the ring F in either direction but when one of the links is pushed edgewise into the slot 2, the chain end is locked in said ring by the next succeeding link which is necessarily at an angle to the plane of the first named link.

Thus each chain E is placed transversely around the tread of the wheel between two adjacent spokes and the other end of the chain is drawn through the larger opening 1 of the ring F and the chain drawn to the desired snugness about the tread. The link of the chain then occupying the opening 1 of the ring is then turned edgewise to and into the slot 2. The next link toward the free end of the chain, being at an angle to the link seated in the slot 2, will bear against the walls of the slot 2 and prevent the chain end being pulled out through the ring.

In the drawings, as a preferred form, I have shown the body of the chain E formed of relatively large twisted links of the usual log chain type which grip the roadway in an ideal manner, while the chain end, which is to be inserted through the locking ring F, is formed of smaller links, such as $a$, $b$, $c$, $d$, etc., thus avoiding an excess size of locking ring. I also prefer said links $a$, $b$, $c$ and $d$ to be of the untwisted or flat type to facilitate the locking effect in the ring F. Thus in Fig. 2, the first small link $a$ is shown opposed or at right angle to the slot 2 of the ring F, the second link $b$ is parallel with said slot and seated therein (see Fig. 3), while the next link $c$ is transverse to said slot and prevents the pulling of the chain end back through said slot.

The outer or loose end of the chain E is engaged by the hook 3 on the outer end of a coiled spring member 4 whose inner end is connected to the central metal annulus G. Thus the loose end of the chain E is held in position, preferably with tautness, to prevent the link $b$ from slipping out of the slot 2 and thus loosening the chain.

The annulus G encircles the hub A of the wheel but need not be mounted on or attached thereto, as it will be properly positioned by its radial connection to the chains E. I prefer to provide a resilient connection between the free ends of chains E and the annulus G but any character of attachment which will straighten out the chain end and prevent the chain link from slipping laterally from the slot 2 will suffice.

I prefer to provide at least six or eight chains per wheel but have obtained satisfactory results in the use of three chains on the driving wheel. On very slippery roads, I may also apply the chains to the front or non-driving wheels.

The advantages of my invention are marked. The chains are capable of creeping between the spokes, thus preventing undue wear or cutting of the tires which results if the chain constantly bears upon one portion of the tire. The chains may be adjusted as tight or loose as may be desired. The strain or pull is exerted upon and resisted by the chain itself and the locking ring F, as the annulus G simply acts to hold the chain ends from unlocking. When a chain breaks, it can be unhooked from the annulus and removed without impairing the efficiency of the remaining chains. The chains are easy to put on or take off and require no alteration in the wheel or tire for their use. The chains are inexpensive but strong and durable.

While I have shown my chains used in connection with the solid tires of a heavy motor truck, they may be used in connection with any vehicle tire, pneumatiic or otherwise.

What I desire to claim is:—

An anti-skid device for a vehicle-wheel, comprising a chain carrying, at one end, a ring through which the other end of the chain is drawn to form a loop around the vehicle-tire, said ring having a locking projection engageable with the links of the chain at any desired point in the length thereof, whereby the length of said loop is maintained constant.

Signed at Pittsburgh, Penna., this 9th day of February 1916.

ALBERT J. HEINSIUS.